(No Model.)

J. H. JONES.
CIRCULAR SAW MILL.

No. 305,598. Patented Sept. 23, 1884.

WITNESSES:

INVENTOR:
J. H. Jones
BY
Munn & Co.
ATTORNEYS.

UNITED STATES PATENT OFFICE.

JOHN HENRY JONES, OF DARDANELLE, ARKANSAS.

CIRCULAR-SAW MILL.

SPECIFICATION forming part of Letters Patent No. 305,598, dated September 23, 1884.

Application filed February 26, 1884. (No model.)

*To all whom it may concern:*

Be it known that I, JOHN HENRY JONES, of Dardanelle, in the county of Yell and State of Arkansas, have invented a new and Improved Saw-Mill, of which the following is a full, clear, and exact description.

The invention consists in the construction, arrangement, and combination of parts, as will be hereinafter fully described and claimed.

Reference is to be had to the accompanying drawings, forming part of this specification, in which similar letters of reference indicate corresponding parts in both the figures.

Figure 1:
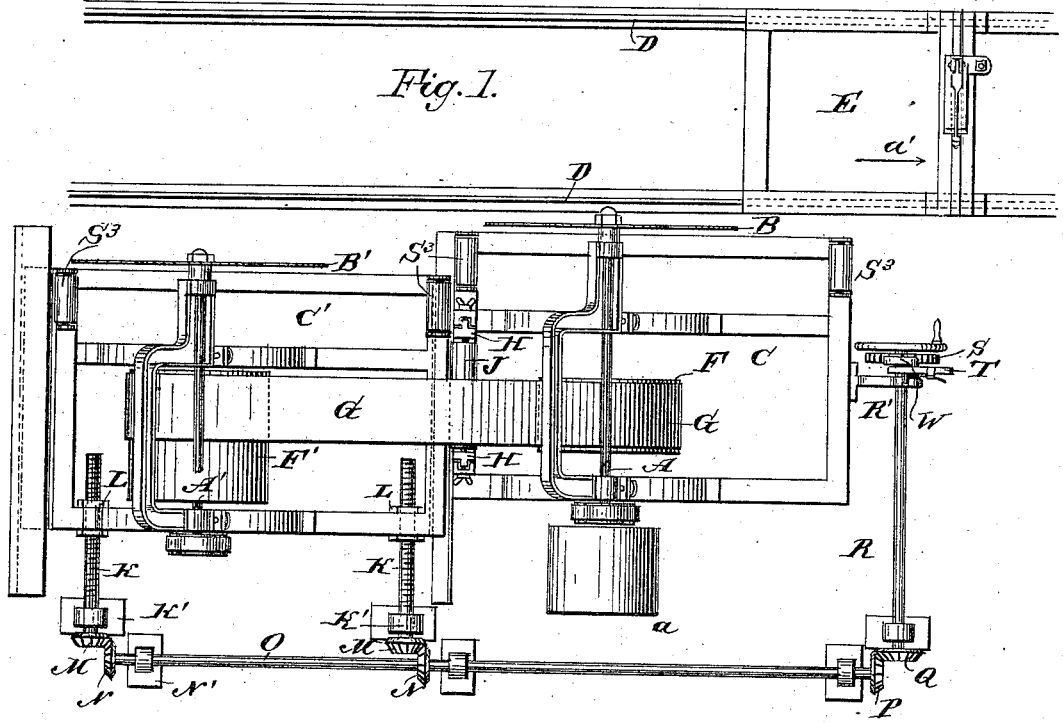
Figure 2:
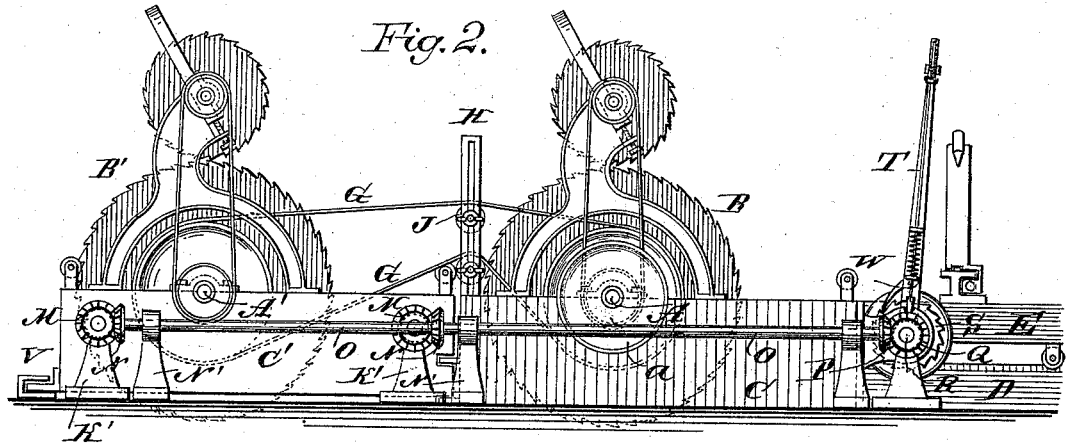

Figure 1 is a plan view of my improved saw-mill, and Fig. 2 is a longitudinal view of the same.

A shaft, A, on one end of which a circular saw, B, is rigidly mounted, is journaled in a fixed frame, C, and on the said shaft A a pulley, $a$, for a driving-belt is mounted. The shaft A is at right angles to the tracks or rails D, on which the log-holding carriage E, of the usual construction, is mounted.

At one end of the frame C a like frame, C', is located, which is adapted to slide on the end of the frame C in a direction at right angles to the log-carriage tracks D—that is, in a direction parallel to the shaft A.

In the frame C' a shaft, A', is journaled, on one end of which a circular saw, B', is mounted, the saw B' being parallel with the saw B, and both saws being parallel with the rails D and the log-carriage E thereon.

On the shaft A' of the carriage C' a belt-pulley, F', is mounted, which is about twice as wide as an endless belt, G, passing over the said pulley, which belt G also passes over a pulley, F, on the shaft A in the frame C. The shaft A is driven by a belt passed over the pulley $a$, and the shaft A' is driven from the shaft A by means of the belt G. As the frame C', in which the shaft A' is journaled, is to be shifted parallel with the shafts A and A', the belt-pulley F' must have such a width that the belt G can slide on the same in the direction of the length of the shafts.

On the end of the fixed frame C standards H are arranged, between which vertically-adjustable tension-rollers J are held for adjusting the tension of the belt G.

As shown, a small saw is held over each saw B or B'; but the small saws can be dispensed with, or the saw-disks B and B' can be constructed in any other suitable manner, without having any effect on my invention. One or more screws, K, held parallel with the shafts A and A', are held to turn on their longitudinal axes in bearings K', secured on the base on which the frame C' slides, the said screws being held in such a manner that they can turn but cannot move lengthwise. The screws K are screwed through threaded sleeves or nuts L in one of the side bars of the frame C'.

On the outer end of each screw K a beveled cog-wheel or pinion, M, is formed, which beveled pinions engage with beveled cog-wheels or pinions N, arranged at right angles to the same and mounted on a shaft, O, journaled parallel with the tracks D and the sides of the frames C and C' in standards or bearings N', secured on the base on which the frame C' slides.

On the shaft O a beveled pinion or cog-wheel, P, is mounted, which engages with another beveled pinion or cog-wheel, Q, arranged at right angles to the cog-wheel P, and mounted on a horizontal shaft, R, arranged at right angles to the shaft O, and journaled in a suitable standard or bearing-block on the base on which the frames rest and an arm, R', of the frame C. On the end of the shaft R a ratchet-wheel, S, is mounted and a lever, T, is held to rock, which lever T is provided with a pawl, W, engaging with the teeth of the ratchet-wheel S, and is also provided with devices for locking it in place. If the shaft R is turned on its longitudinal axis by means of the lever T, the shaft O will also be revolved on its longitudinal axis, and will turn the screw K, thereby moving the frame C' and the saw-disk B' a greater or less distance to or from the adjoining rail D or from the carriage E. The frame C' can thus be moved in either direction very easily, and the saw-disks B and B' can easily be so adjusted that they will both be in the same vertical plane or in two parallel vertical planes separated a greater or less distance.

The frame C' is provided with suitable means for guiding it in its movement.

If the log-carriage E moves in the direction of the arrow $a'$, the saw B' will first cut into the log or plank held on the carriage, and will cut a strip of a certain thickness from the same; the saw B also cuts a strip or plank from the log. By adjusting the saws the part cut between the two saws can be made of any desired thickness.

If desired, the sliding frame C' can be removed entirely and the saw held in the frame C used alone.

In place of the lever T and the ratchet and screws for moving the frame C', any other suitable device can be used for the same purpose.

$S^3$ are bearing-rollers fixed in front of and after each saw, to be on a level with the face of the head-blocks mounted on the carriage, and are intended for the log to rest on when thrown beyond the saws, and to hold the plank after being cut from the log.

Having thus described my invention, what I claim as new, and desire to secure by Letters Patent, is—

1. In a saw-mill, the combination, with the fixed frame C, carrying the shaft A, on which the circular saw B is mounted, of the sliding frame C', carrying the shaft A', on which the circular saw B' is mounted, the screws K, screwed into the frame C', and provided at their outer ends with beveled cog-wheels M, the shaft O, carrying the beveled cog-wheels N, engaging with the beveled cog-wheels M, and of means for revolving the shaft O, substantially as herein shown and described.

2. The combination of the stationary frame C, its saw-arbor and pulley F, and the sliding adjustable frame C' and its saw-arbor and pulley F', with the vertical slotted standards H between said frames, and the adjustable tension-rollers J for the belt, substantially as set forth.

JOHN HENRY JONES.

Witnesses:
C. D. HAM,
W. D. COTTON.